US012664973B2

(12) United States Patent (10) Patent No.: US 12,664,973 B2
Dong et al. (45) Date of Patent: Jun. 23, 2026

(54) VOICE DIALOGUE PROCESSING METHOD AND APPARATUS

(71) Applicant: AI Speech Co., Ltd., Suzhou (CN)

(72) Inventors: Xin Dong, Suzhou (CN); Zhongyuan Dai, Suzhou (CN); Min Chu, Suzhou (CN); Han Gu, Suzhou (CN)

(73) Assignee: AI Speech Co., Ltd., Suzhou (CN)

( * ) Notice: Subject to any disclaimer, the term of this patent is extended or adjusted under 35 U.S.C. 154(b) by 954 days.

(21) Appl. No.: 17/635,489

(22) PCT Filed: Dec. 9, 2019

(86) PCT No.: PCT/CN2019/123937
§ 371 (c)(1),
(2) Date: Feb. 15, 2022

(87) PCT Pub. No.: WO2021/027198
PCT Pub. Date: Feb. 18, 2021

(65) Prior Publication Data
US 2022/0293089 A1 Sep. 15, 2022

(30) Foreign Application Priority Data

Aug. 15, 2019 (CN) .......................... 201910752714.0

(51) Int. Cl.
*G10L 15/22* (2006.01)
*G06F 16/3329* (2025.01)
(Continued)

(52) U.S. Cl.
CPC ........ *G10L 15/063* (2013.01); *G06F 16/3329* (2019.01); *G06Q 30/016* (2013.01);
(Continued)

(58) Field of Classification Search
None
See application file for complete search history.

(56) References Cited

U.S. PATENT DOCUMENTS 6,321,198 B1 * 11/2001 Hank .................. H04M 3/4936
704/275
7,143,042 B1 * 11/2006 Sinai ...................... G10L 15/22
704/E15.04
(Continued)

FOREIGN PATENT DOCUMENTS

CN 105845137 A 8/2016
CN 107135247 A 9/2017
(Continued)

OTHER PUBLICATIONS

Office Action regarding Chinese Patent 201910752714.0, The State Intellectual Property Office of People's Republic of China.

*Primary Examiner* — Richa Sonifrank
(74) *Attorney, Agent, or Firm* — Sisson & Banyas, Attorneys at law, LLC; Edwin A. Sisson

(57) ABSTRACT

The present application discloses a voice dialogue processing method and apparatus. The voice dialogue processing method includes: determining a voice semantics corresponding to a user voice to be processed; determining a reply sentence for the voice semantics based on a dialogue management engine, a training sample set of which is constructed from a dialogue business customization file including at least one dialogue flow, and the dialogue flow includes a plurality of dialogue nodes in a set order; and generating a customer service voice for replying to the user voice according to the determined reply sentence.

18 Claims, 17 Drawing Sheets

(51) Int. Cl.

| | | |
|---|---|---|
| *G06Q 30/016* | (2023.01) | |
| *G10L 13/00* | (2006.01) | |
| *G10L 15/00* | (2013.01) | |
| *G10L 15/06* | (2013.01) | |
| *G10L 15/30* | (2013.01) | |
| *H04M 3/493* | (2006.01) | |
| *H04M 3/527* | (2006.01) | |
| *G10L 15/18* | (2013.01) | |

(52) U.S. Cl.
CPC ............. *G10L 13/00* (2013.01); *G10L 15/00* (2013.01); *G10L 15/22* (2013.01); *G10L 15/30* (2013.01); *H04M 3/493* (2013.01); *H04M 3/4936* (2013.01); *H04M 3/527* (2013.01); *G10L 2015/0638* (2013.01); *G10L 15/1822* (2013.01); *G10L 2015/226* (2013.01); *H04M 2201/39* (2013.01); *H04M 2201/40* (2013.01); *H04M 2203/355* (2013.01)

(56) References Cited

U.S. PATENT DOCUMENTS

| | | | | |
|---|---|---|---|---|
| 8,442,812 | B2 * | 5/2013 | Ehsani | .................. G10L 15/193 704/231 |
| 10,628,133 | B1 * | 4/2020 | Jiang | ....................... H04L 51/02 |
| 10,832,002 | B2 * | 11/2020 | Kozhaya | ............. G06F 11/3438 |
| 11,019,004 | B1 * | 5/2021 | Sohrweide | .............. H04L 51/02 |
| 11,216,291 | B1 * | 1/2022 | Dhanabal | .............. H04L 63/105 |
| 11,430,446 | B1 * | 8/2022 | Wen | ........................ H04L 51/02 |
| 2010/0063823 | A1 | 3/2010 | Wu et al. | |
| 2014/0037075 | A1 | 2/2014 | Bouzid | |
| 2016/0042735 | A1 * | 2/2016 | Vibbert | ............... G10L 15/1822 704/257 |
| 2017/0048170 | A1 * | 2/2017 | Smullen | .................. H04L 67/02 |
| 2017/0116173 | A1 * | 4/2017 | Lev-Tov | ................. G06F 40/35 |
| 2017/0118336 | A1 | 4/2017 | Tapuhi | |
| 2018/0052573 | A1 * | 2/2018 | Comertoglu | ........... G06F 16/14 |
| 2018/0090132 | A1 * | 3/2018 | Ikeno | .................. G10L 15/1815 |
| 2018/0129484 | A1 * | 5/2018 | Kannan | .................... G06F 3/167 |
| 2018/0212904 | A1 * | 7/2018 | Smullen | .................. H04L 51/02 |
| 2019/0066660 | A1 * | 2/2019 | Liang | .................... G10L 15/183 |
| 2019/0182382 | A1 * | 6/2019 | Mazza | .................. H04M 3/527 |
| 2019/0295545 | A1 * | 9/2019 | Andreas | .............. G10L 15/1815 |
| 2020/0007682 | A1 * | 1/2020 | Tapuhi | ............... G06F 16/3329 |
| 2020/0126540 | A1 * | 4/2020 | Panchamgam | ... G06F 16/90332 |
| 2020/0219494 | A1 * | 7/2020 | Dhoolia | .................. G10L 15/16 |
| 2020/0258514 | A1 * | 8/2020 | Park | ........................ G10L 15/22 |
| 2021/0006515 | A1 * | 1/2021 | Downs | .................. G06F 40/186 |
| 2021/0150150 | A1 * | 5/2021 | Wu | ........................ G06F 40/35 |
| 2022/0004702 | A1 * | 1/2022 | Liang | .................. G10L 15/183 |
| 2022/0293089 | A1 * | 9/2022 | Dong | .................. G10L 15/063 |
| 2025/0356244 | A1 * | 11/2025 | Truong | .................. G06N 20/00 |

FOREIGN PATENT DOCUMENTS

| | | |
|---|---|---|
| CN | 107657017 A | 2/2018 |
| CN | 108053023 A | 5/2018 |
| CN | 108427722 A | 8/2018 |
| CN | 108664568 A | 10/2018 |
| CN | 109408800 A | 3/2019 |
| CN | 109597607 A | 4/2019 |
| CN | 109739605 A | 5/2019 |
| CN | 109891410 A | 6/2019 |
| CN | 110442701 A | 11/2019 |

* cited by examiner

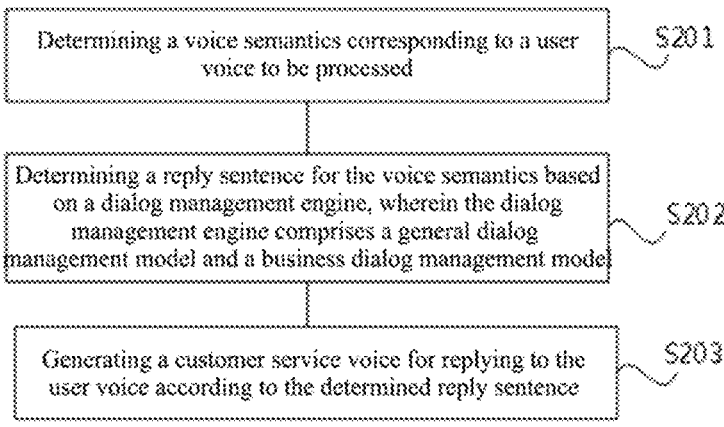

Determining a voice semantics corresponding to a user voice to be processed — S201

Determining a reply sentence for the voice semantics based on a dialog management engine, wherein the dialog management engine comprises a general dialog management model and a business dialog management model — S202

Generating a customer service voice for replying to the user voice according to the determined reply sentence — S203

Fig. 2

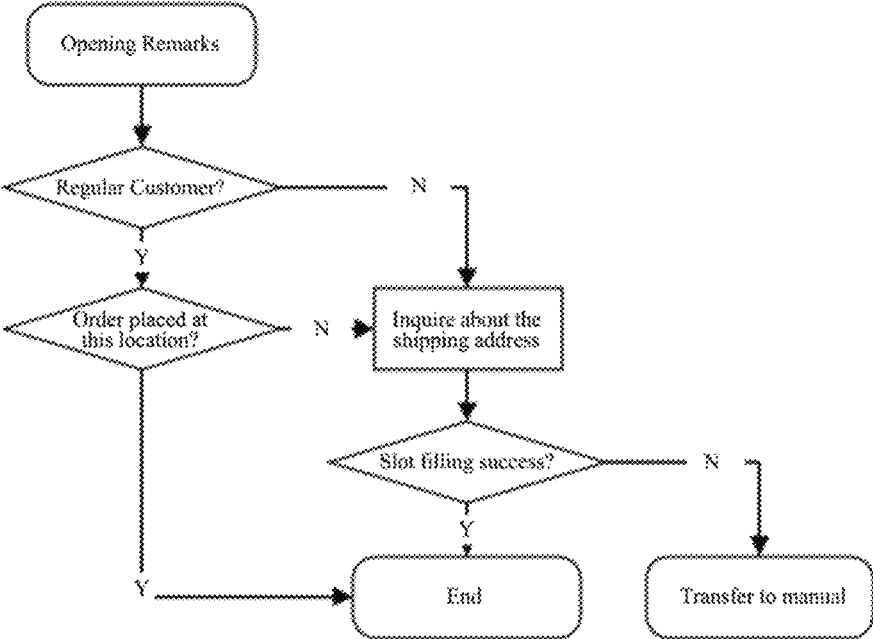

Fig. 3

Obtaining a dialog flow design request, determining at least one dialog flow corresponding to the dialogue flow design request — S601

Generating a dialog business customization file according to the at least one dialog flow — S602

Sending the dialog business customization file to a voice customer service server — S603

VOICE DIALOGUE PROCESSING METHOD AND APPARATUS

The present disclosure claims the benefit and priority of International patent application No. PCT/CN2019/123937 filed on 9 Dec. 2019 and Chinese patent application No. 201910752714.0 filed on 15 Aug. 2019, the entire disclosure of each of which is incorporated herein by reference in their entirety as part of the present application.

TECHNICAL FIELD

The present application relates to a technical field of intelligent customer service, and for example, to a voice dialogue processing method and apparatus.

BACKGROUND

Human-computer interaction is a technology that studies the interaction between a person and a computer system. AI (Artificial Intelligence) dialogue system is a new type of human-computer interaction with input and output through natural speech or natural language. At present, the AI dialogue system has been widely used in scenarios such as smart phones, smart homes, smart vehicles, and smart customer service.

However, the dialogue business flow and content required by different provider are different, so it is desired for each provider to customize its own voice dialogue system. At present, the complexity of business logic results in the complexity of the development of the dialogue flow of the AI dialogue system, which leads to the inefficiency of the customized development of dialogue business. In addition, when a provider needs to maintain and modify the business flow or content, it may be necessary to repeatedly develop or modify the code logic, which is not beneficial to the post-maintenance of the business flow.

SUMMARY OF THE INVENTION

The present application provides a voice dialogue processing method and device for solving at least one of the above technical problems.

In a first aspect, an embodiment of the present application provides a voice dialogue processing method, which is applied to a voice customer service server. The method includes: determining a voice semantics corresponding to a user voice to be processed; determining a reply sentence for the voice semantics based on a dialogue management engine, a training sample set of which is constructed from a dialogue business customization file including at least one dialogue flow, and the dialogue flow includes a plurality of dialogue nodes in a set order; and generating a customer service voice for replying to the user voice according to the determined reply sentence.

In a second aspect, an embodiment of the present application provides a voice customer service method, which is applied to a dialogue flow design server. The method includes: acquiring a dialogue flow design request from a dialogue flow design client, and determining at least one dialogue flow corresponding to the dialogue flow design request, wherein the dialogue flow includes a plurality of dialogue nodes in a set order; generating a dialogue business customization file according to the at least one dialogue flow; and sending the dialogue business customization file to a voice customer service server to construct a training sample set for a dialogue management engine so that the voice customer service server performs a voice customer service based on the dialogue management engine.

In a third aspect, an embodiment of the present application provides a voice dialogue processing device, including: a voice semantics determining unit for determining a voice semantics corresponding to a user voice to be processed; a dialogue management engine calling unit for determining a reply sentence for the voice semantics based on a dialogue management engine, a training sample set of which is constructed from a dialogue business customization file including at least one dialogue flow, and the dialogue flow includes a plurality of dialogue nodes in a set order; and a customer service voice generating unit for generating a customer service voice for replying to the user voice according to the determined reply sentence.

In a fourth aspect, an embodiment of the present application provides a voice dialogue processing device, comprising: a dialogue flow determining unit for acquiring a dialogue flow design request from a dialogue flow design client, and determining at least one dialogue flow corresponding to the dialogue flow design request, wherein the dialogue flow includes a plurality of dialogue nodes in a set order; a business customization file generating unit for generating a dialogue business customization file according to the at least one dialogue flow; and a business customization file sending unit for sending the dialogue business customization file to a voice customer service server to construct a training sample set for a dialogue management engine so that the voice customer service server performs a voice customer service based on the dialogue management engine.

In a fifth aspect, an embodiment of the present application provides an electronic device, including: at least one processor, and a memory communicatively connected to the at least one processor, wherein the memory stores instructions executable by the at least one processor, which are executed by the at least one processor to enable the at least one processor to perform steps of the above method.

In a sixth aspect, an embodiment of the present application provides a storage medium storing a computer program, which implements steps of the above method when executed by a processor.

The present application utilizes a dialogue management engine to determine the reply sentence corresponding to the voice semantics of the user voice. Here, the training sample set of the dialogue management engine is constructed from the dialogue business customization file including at least one dialogue flow with a plurality of dialogue nodes in a set order. It is simple and convenient to prepare the dialogue business customization file, which does not involve modifying the code logic, making the dialogue business customization development simpler and more efficient. In addition, an iterative operation of the dialogue management engine can be completed by replacing the business customization file, which facilitates the post-maintenance of the business flow.

BRIEF DESCRIPTION OF THE DRAWINGS

FIG. 2 shows a flowchart of an example of the voice dialogue processing method applied to a voice customer service server;

FIG. 3 shows a schematic diagram of an example of a dialogue flow according to the present embodiment;

DETAILED DESCRIPTION

Figure 1:
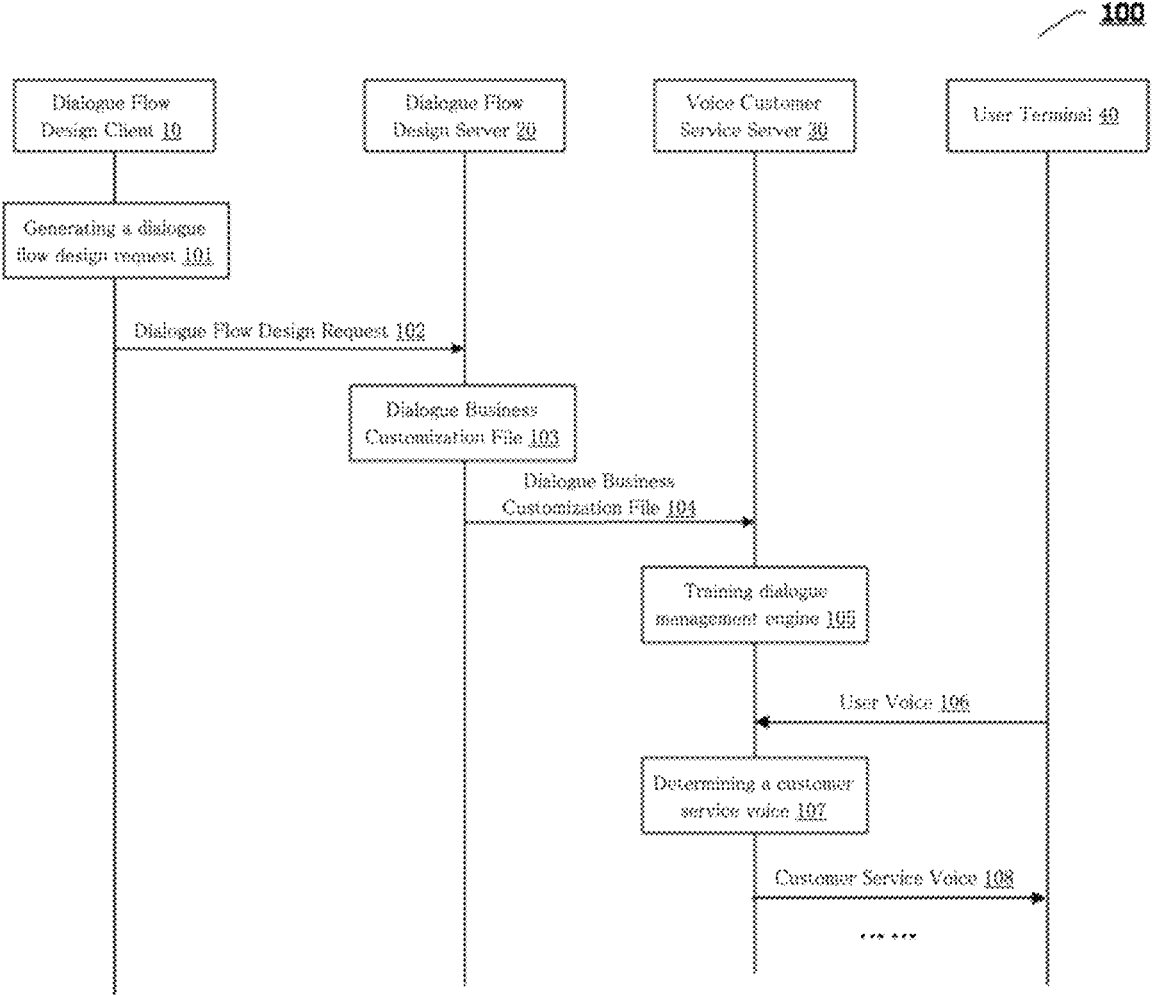
FIG. 1 is a flowchart of a voice dialogue processing method according to an embodiment of the present application.

In order to make the purposes, technical solutions and advantages of embodiments of the present application more clear, the technical solutions of the embodiments of the present application will be clearly and completely described below with reference to the drawings of the embodiments of the present application. Obviously, the described are merely some but not all of the embodiments of the present invention. It should be noted that the embodiments in the present application and the features in these embodiments can be combined with each other without conflict.

The present application can be described in the general context of computer-executable instructions such as program modules executed by a computer. Generally, program modules include routines, programs, objects, elements, and data structures, etc. that performs specific tasks or implement specific abstract data types. The present application can also be practiced in distributed computing environments in which tasks are performed by remote processing devices connected through a communication network. In a distributed computing environment, program modules may be located in local and remote computer storage media including storage devices.

In the present application, "module", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as "including" and "comprising" shall mean that not only those elements described thereafter, but also other elements not explicitly listed, or elements inherent to the described processes, methods, objects, or devices, are included. In the absence of specific restrictions, elements defined by the phrase "including . . . " do not mean excluding other identical elements from process, method, article or device involving these mentioned elements.

As used herein, the term "engine" refers to a structure formed by encapsulating at least one algorithm model. The term "intent" represents a categorization for a sentence. For example, a user's sentence "goodbye" should be categorized as the intent "dialogue ends".

As shown in FIG. 1, an exemplary flow of the voice dialogue processing method according to an embodiment of the present application involves communication interaction among multiple execution subjects, for example, communication interaction among a dialogue flow design client 10, a dialogue flow design server 20, a voice customer service server 30 and a user terminal 40. The client and the user terminal may be any type of terminal device such as a notebook computer, a tablet computer, a mobile phone, etc., and for example a terminal device installed with a specific application program. In addition, the server may be the one in a central communication network architecture or a master node device for providing services in a peer-to-peer communication network architecture.

Referring to FIG. 1, a flow 100 of the voice dialogue processing method according to the embodiment of the present application includes following steps.

In step 101, a dialogue flow design request is generated by the dialogue flow design client 10.

In this step, the dialogue flow design client 10 receives a user operation of a voice business personnel of a provider, and generates a corresponding dialogue flow design request according to the user operation. Here, the dialogue flow design request may be a request instruction for one or more dialogue flows that have been designed, and the dialogue flow may include a plurality of dialogue nodes in a set order.

Exemplarily, the voice business personnel of the provider can draw a plurality of dialogue flows for one dialogue project on the dialogue flow design client 10, and generate a dialogue flow design request according to the plurality of dialogue flows. In addition, the dialogue flow design client can be configured to have a graphical interface that allows a user to drag and drop dialogue node boxes, so that the voice business personnel of the provider can quickly realize the construction of the dialogue flow by dragging and dropping the dialogue node boxes.

In step 102, the dialogue flow design client 10 sends the dialogue flow design request to the dialogue flow design server 20.

In step 103, the dialogue flow design server 20 generates a dialogue business customization file according to the dialogue flow design request.

Exemplarily, the dialogue flow design server 20 parses at least one dialogue flow in the dialogue flow design request, automatically identifies a node content and node type of each ordered node in the dialogue flow, and generates a dialogue business customization file. The dialogue business customization file may be a j son file. Here, the dialogue flow design server 20 can determine the dialogue business customization file through a plurality of interactive operations (e.g., a plurality of dialogue flow design requests) with the dialogue flow design client 10.

In step 104, the dialogue flow design server 20 sends the dialogue business customization file to the voice customer service server 30.

In step 105, the voice customer service server 30 trains a dialogue management engine based on the dialogue service customization file.

Here, the voice customer service server 30 can generate a training sample set for the dialogue management engine based on the dialogue business customization file, and then use the training sample set to train the dialogue management engine.

In step 106, the user terminal 40 sends a user voice to the voice customer service server 30.

Here, it can go live after completing the training of the dialogue management engine. At this time, the voice customer service server after going live can receive the user voice from the user terminal and provide services for the user.

In step 107, the voice customer service server 30 determines a customer service voice for the user voice.

The voice customer service server 30 can determine a voice semantics corresponding to the user voice to be processed, which can be achieved through applying an ASR (Automatic Speech Recognition) function module and an NLU (Natural Language Understanding) function module, for example. Then, the voice customer service server 30 determines a reply sentence for the voice semantics by invoking the dialogue management engine, and generates a customer service voice for replying to the user voice according to the determined reply sentence. In the process of generating the customer service voice by using the reply sentence, it can be implemented by the voice customer service server 30 through applying an NLG (Natural Language Generation) function module and a TTS (Text To Speech) function module.

In step 108, the voice customer service server 30 sends the customer service voice to the user terminal 40.

It can be understood that the above steps 106-108 can be repeated to provide customer service voices for many times

6 processing a general dialogue and the business dialogue management model for processing a specialized business. The general dialogue management model can be shared among a plurality of different business customer service projects to reuse code logic and improve the development efficiency of the customer service system.

In the call center scenario of intelligent customer service, some specific oral replies such as "um", "ah", or "hi" often occur in a phone call. In addition, the phone call is often accompanied by a general dialogue request such as greetings, interruptions, repetitions, and clarifications by the user. However, the current AI dialogue system rarely optimizes the processing of such dialogue request in the call center scenario, resulting in too rigid customer service process and affecting user experience.

Through the general dialogue management model in the embodiment of the present application, the above-mentioned dialogue request can be better handled, and the user experience can be improved. The user intent indicated by the voice semantics of the user voice is determined, and when it belongs to a general intent set, a general dialogue operation for the user intent is performed using the general dialogue management model. The general dialogue operation includes any of the following: switching to manual operation, repeating broadcast operation, exiting dialogue operation, and interjection processing operation.

Table 1 shows a description of related processes involved in the general dialogue operation performed for each general intent in the general intent set.

TABLE 1

| 1. General Intent | 2. Flow Description |
|---|---|
| 3. General-to-Manual | 4. A flow of switching to manual processing, when a user expresses to transfer to manual operation, the dialogue robot will perform the operation of switching to manual processing. |
| 5. Mute Processing | 6. The mute intent refers to that the intent is generated when a user does not speak for a certain period of time during a call. |
| 7. Repeat | 8. A user asks the robot to repeat a previous round of system reply, or the user expresses that he/she does not hear or understand. |
| 9. Goodbye | 10. When a user says goodbye, the dialogue exits by default. |
| 11. Interjection Processing | 12. A processing for the intent of the interjection, such as ah, um, oh, etc., in a process of dialogue. | until satisfactory service is provided to the user. In addition, the embodiment shown in FIG. 1 is only an example, and some steps in the above flow are optional or replaceable. For example, the voice customer service server can also directly obtain the dialogue service customization file locally.

FIG. 2 shows a flow of an example of the voice dialogue processing method applied to the voice customer service server 30 according to an embodiment of the present application, including the following steps.

In step 201, the voice semantics corresponding to the user voice be processed is determined.

In step 202, the reply sentence for the voice semantics is determined based on the dialogue management engine, wherein the dialogue management engine includes a general dialogue management model and a business dialogue management model.

In step 203, a customer service voice for replying to the user voice is generated according to the determined reply sentence.

In the present embodiment, the dialogue management engine includes the general dialogue management model for In some embodiments, when a user intent does not fall into the general intent set, the business dialogue management model is used to determine the reply sentence by performing business operations including: determining a target dialogue flow corresponding to the user intent, and determining the reply sentence according to the dialogue nodes in the determined target dialogue flow.

For an example, the dialogue nodes include a dialogue start node, a user communication node, a user information identification node, and a slot filling node. The dialogue start node is a node where the dialogue flow starts. The user communication node is a node where the customer service needs to communicate with the user. The user information identification node may identify user information by calling other service APIs (for example, through functions). A slot filling node is a node where the final collected information is added to a corresponding slot. In this way, the corresponding dialogue node in the target dialogue flow can be called based on the user intent, so as to perform the corresponding operation to determine the reply sentence.

Referring to the dialogue flow shown in FIG. 3. When the user voice is connected to the customer service platform, it is directly identified whether he/she is a regular user through the user information identification node in the dialogue flow. If it is a regular user, the user will be directly asked whether to place an order at the location indicated in the historical express record; if he/she is a new user, the user communication node in the dialogue flow will be called to ask the user for the shipping address. After obtaining the shipping address from the user feedback voice by using the voice recognition technology, the slot filling operation is completed, and if it is not recognized or the slot filling is unsuccessful, it can be transferred to manual customer service for processing.

Figure 4:
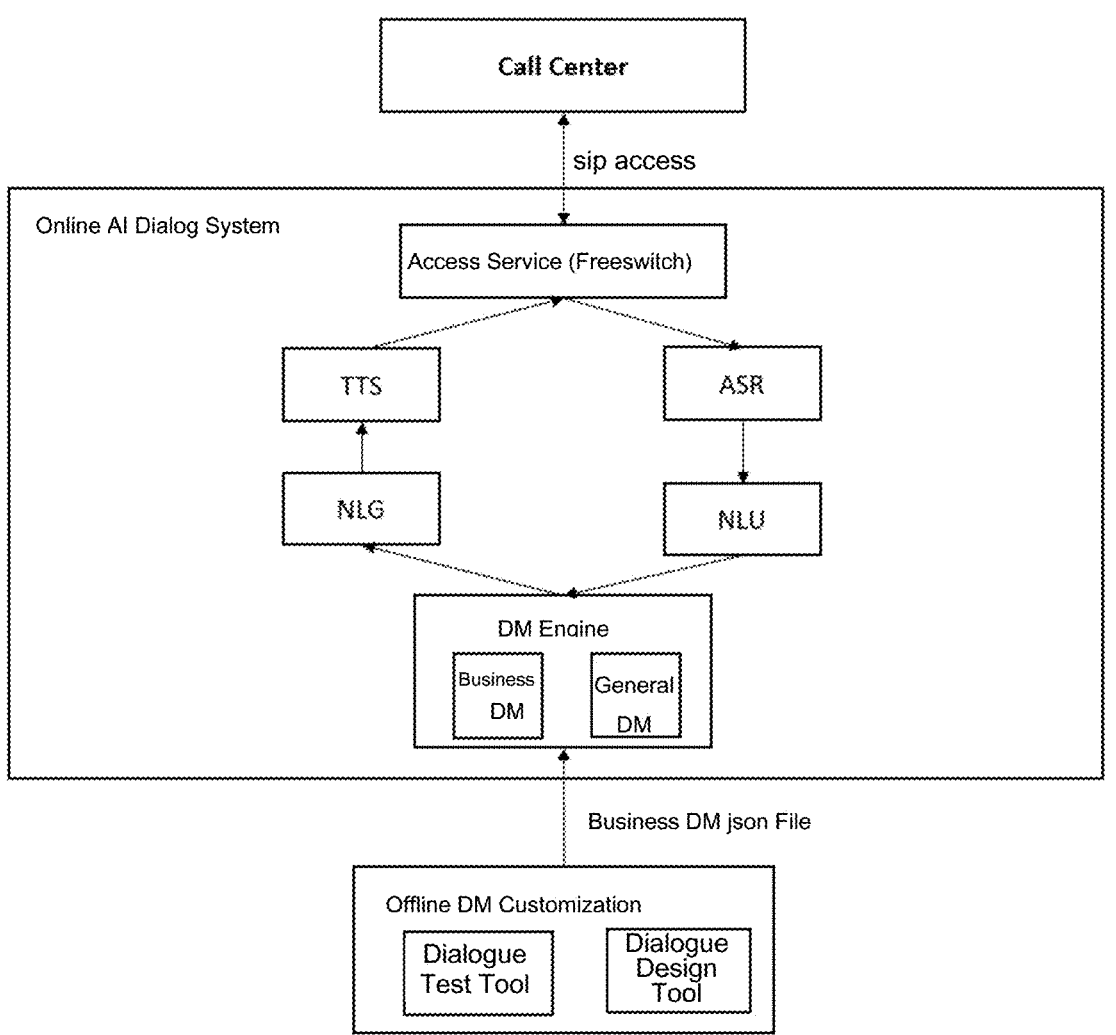
FIG. 4 shows a schematic diagram of an exemplary principle architecture suitable for applying the voice dialogue processing method according to an embodiment of the present application.

FIG. 4 shows an exemplary principle architecture suitable for applying the voice dialogue processing method according to an embodiment of the present application, which generally includes an online AI dialogue system and an offline DM (Dialogue Management) customization platform. Here, an access service module of the online AI dialogue system is connected with a call center of the user client through a sip (session initiation protocol), so as to provide services for the user indicated by the user client.

In addition, there are several large component modules in the online AI dialogue system, including: an ASR module, an NLU module, an NLG module, a TTS module and a DM engine. Among them, the DM engine is divided into a business DM and a general DM.

In the embodiment of the present application, for the scenario of a call center, the dialogue management in the AI dialogue system is divided into two types: a business-type DM and a general-purpose DM. The business DM is dialogue management related to a specific business flow. The general DM design is to handle the general dialogue management of the human-computer dialogue process, making the entire dialogue smoother without involving specific business scenarios and knowledge.

In a telephone dialogue of the call center scenario, there are many more general dialogues, such as greetings, interruptions, repetitions, and clarifications, etc. The general DM can be used to handle all these general dialogue logics, as shown in Table 1. The general DM can be embedded into a front side of any business DM as a general module, making the dialogue closer to the effect of chat communication between people. This design can not only improve the user experience, but also save the customized development cost of DM in different scenarios.

Figure 5:
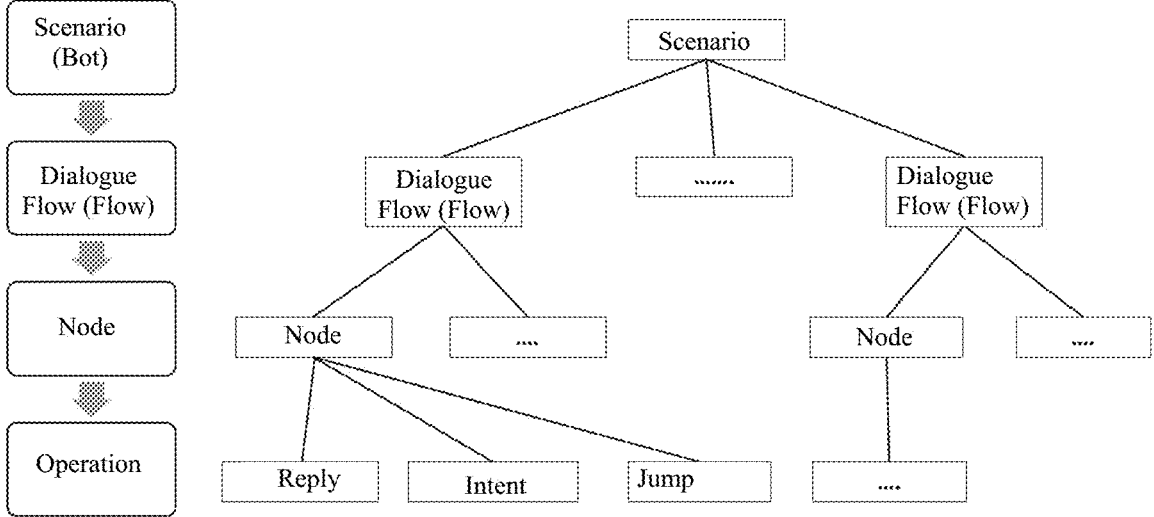
FIG. 5 shows a flow chart of the principle of modeling through a dialogue management engine in an online dialogue system according to an embodiment of the present application.

FIG. 5 shows the principle process of modeling through the DM engine in the online AI dialogue system according to an embodiment of the present application. In order to realize the rapid customization of business DM, the key elements in the dialogue management are modeled, so that the business dialogue flow can be described in the form of j son file. The specific description is as follows:

Scenario (Bot): a dialogue robot, which can be understood as a customer service project.

Dialogue Flow (Flow): a dialogue process for completing a task. A project consists of one or more dialogue flows.

Dialogue Node (Node): a round of dialogue in the dialogue flow, providing different node types, such as a start node, a user communication node, a slot filling node, a user information identification node, etc. The start node is a node from which a dialogue flow starts, the user communication node is a round of dialogue, the slot filling node is a special node designed to collect slots so as to complete the slot information, and in the user information identification node other service API accesses are packaged.

Operation: specific operations involved in the dialogue node, such as a phrase that the dialogue node replies to the user, a list of intents used to parse the user voice, and a jump logic. Therefore, after determining the dialogue node, corresponding specific operations can be performed directly according to the content and type indicated by the dialogue node.

In combination with the example in FIG. 4, a dialogue flow is designed through the offline DM customization platform. The offline DM customization platform includes a dialogue design tool and a dialogue test tool, which provide a graphical drag-and-drop method for dialogue design and test. The offline DM customization platform will generate a j son format file from the dialogue of the project. The online DM engine loads the file, produces an AI dialogue robot, and serves online traffic.

Figure 6:
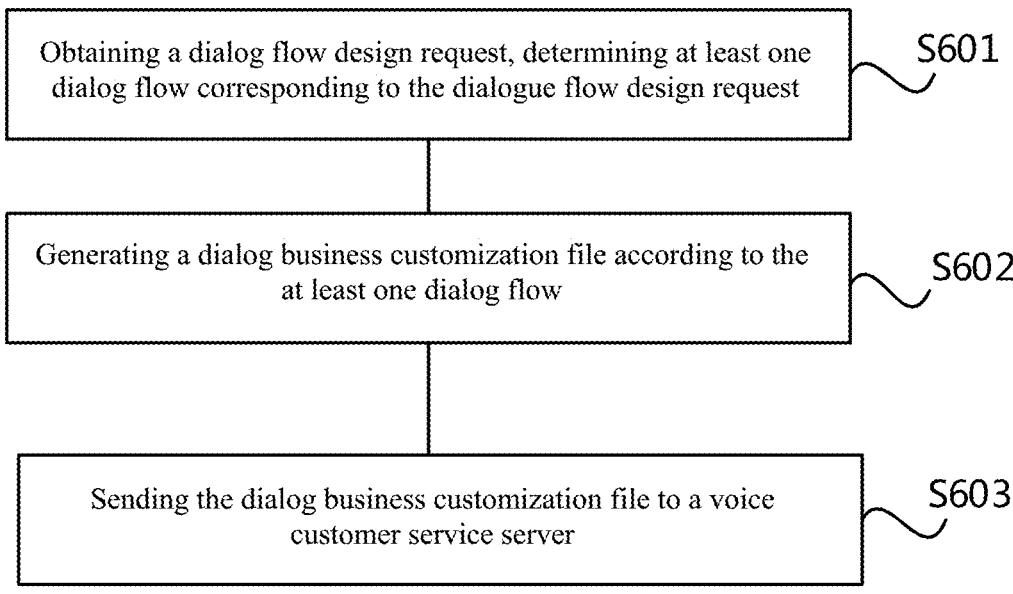
FIG. 6 shows a flowchart of a voice customer service method applied to a dialogue flow design server.

FIG. 6 shows a flow of a voice customer service method applied to a dialogue flow design server. Through the interactive operation between the dialogue flow design server and the dialogue flow design client, the rapid customization of the dialogue flow and the construction of the corresponding dialogue business customization file are realized. The method includes the following steps.

In step 601, a dialogue flow design request is acquired from a dialogue flow design client, and at least one dialogue flow corresponding to the dialogue flow design request is determined. The dialogue flow includes a plurality of dialogue nodes in a set order.

In step 602, a dialogue business customization file is generated according to the at least one dialogue flow.

In step 603, the dialogue business customization file is sent to a voice customer service server to construct a training sample set for a dialogue management engine, so that the voice customer service server performs the voice service based on the dialogue management engine.

The dialogue flow design client is configured to have a graphical interface that allows a user to drag and drop dialogue node boxes. The dialogue flow design client 10 is configured to receive the corresponding dialogue flow design request generated by a developer of a provider for the user operation of the graphical interface. In this way, the provider can generate a business-oriented dialogue flow by dragging and dropping the graphical interface of the development client to generate corresponding j son files, and quickly complete business-oriented DM customization.

Figure 7A:
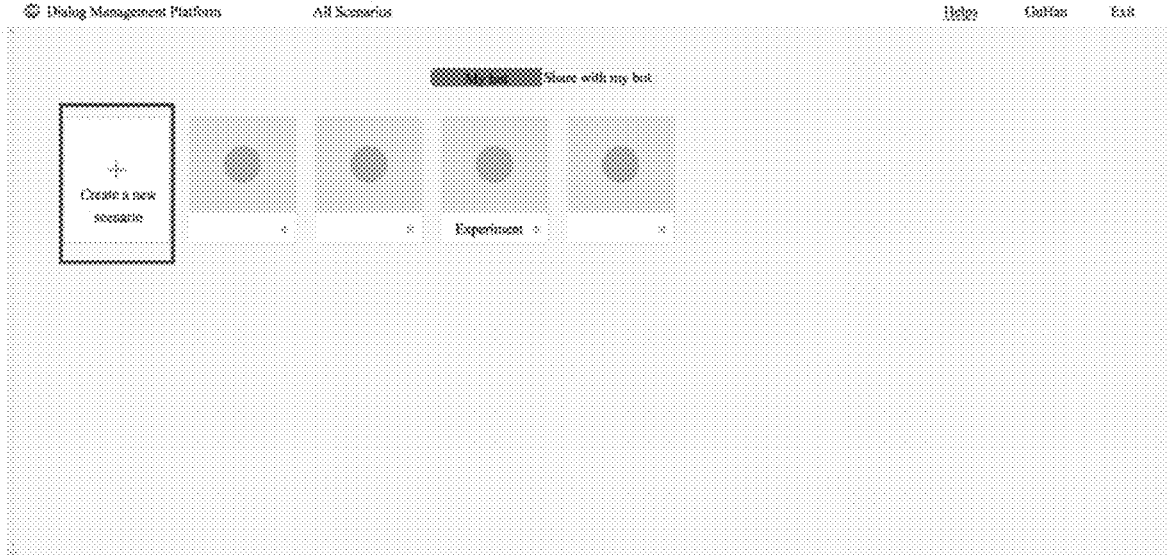
FIGS. 7A-7Z respectively show examples of screenshot interfaces of a dialogue design client in different states during the process of building a dialogue flow.
Figure 7B:
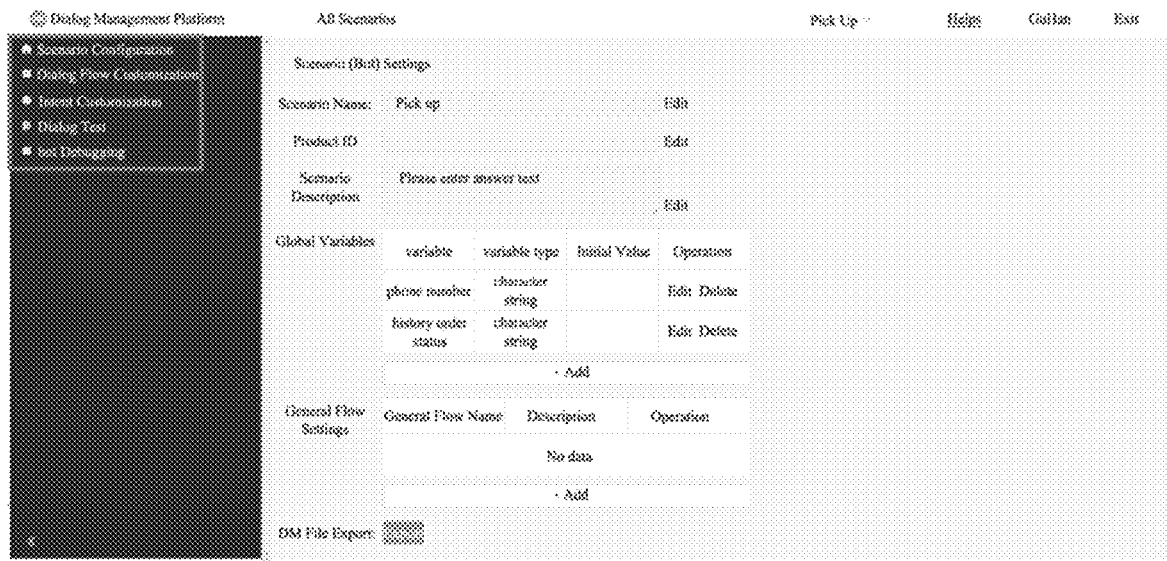
Figure 7C:
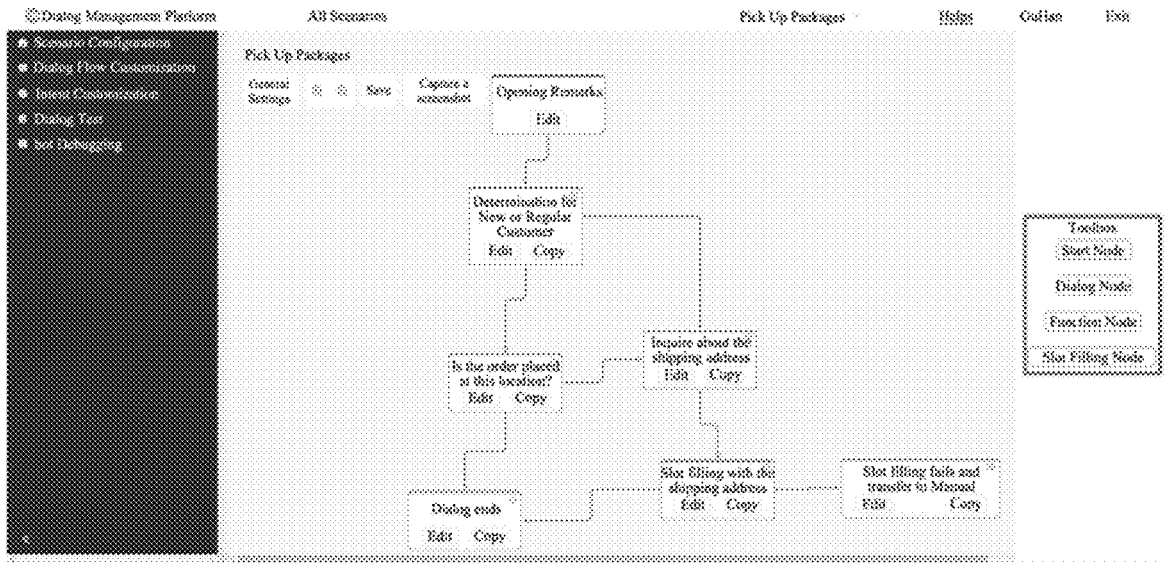
Figures 7D, 7E:
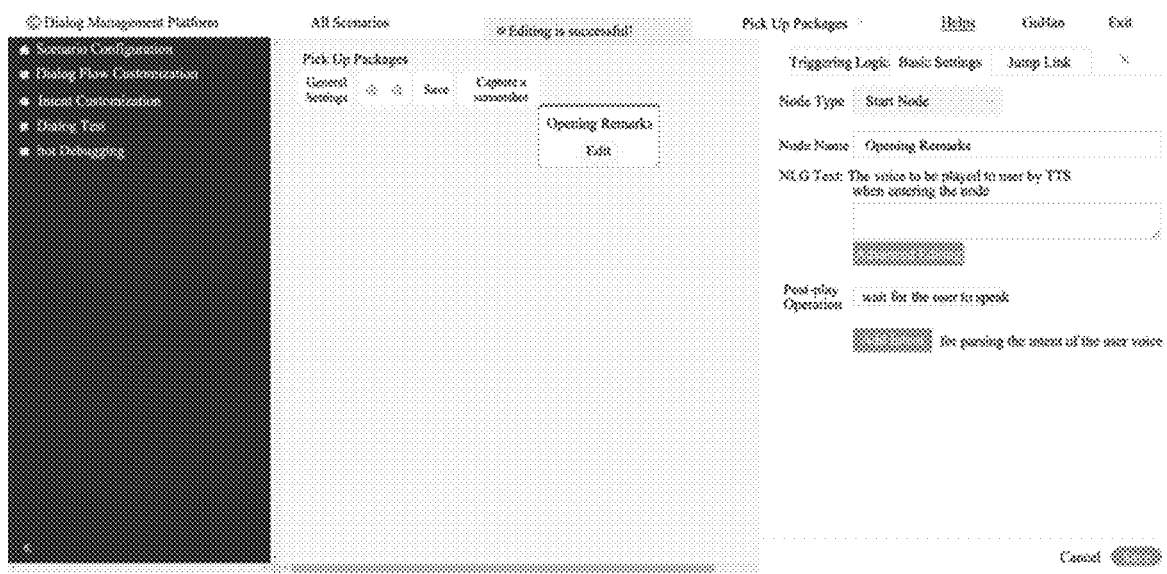
Figure 7F:
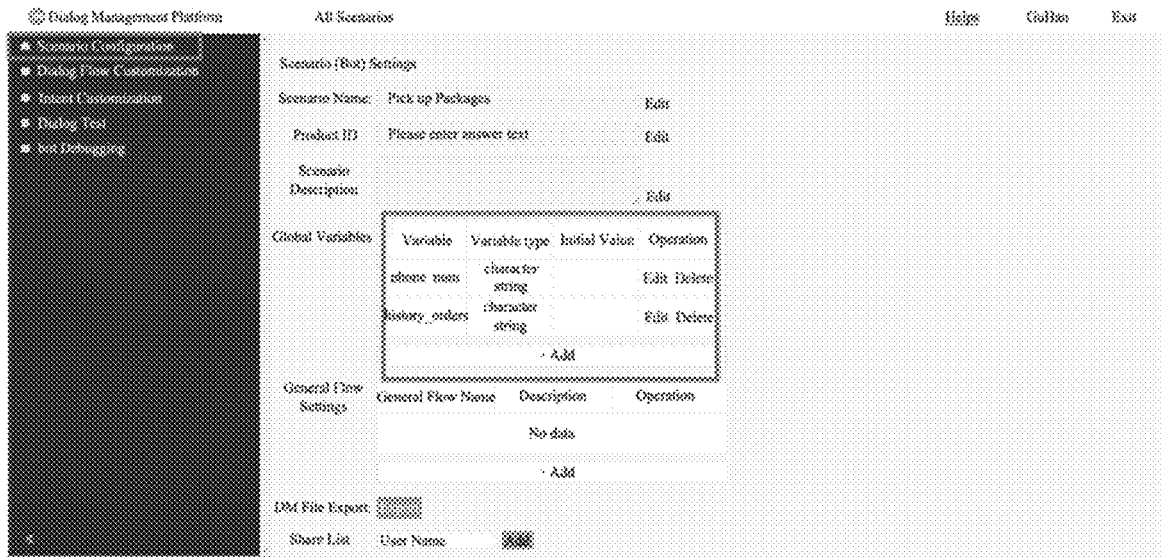
Figure 7G:
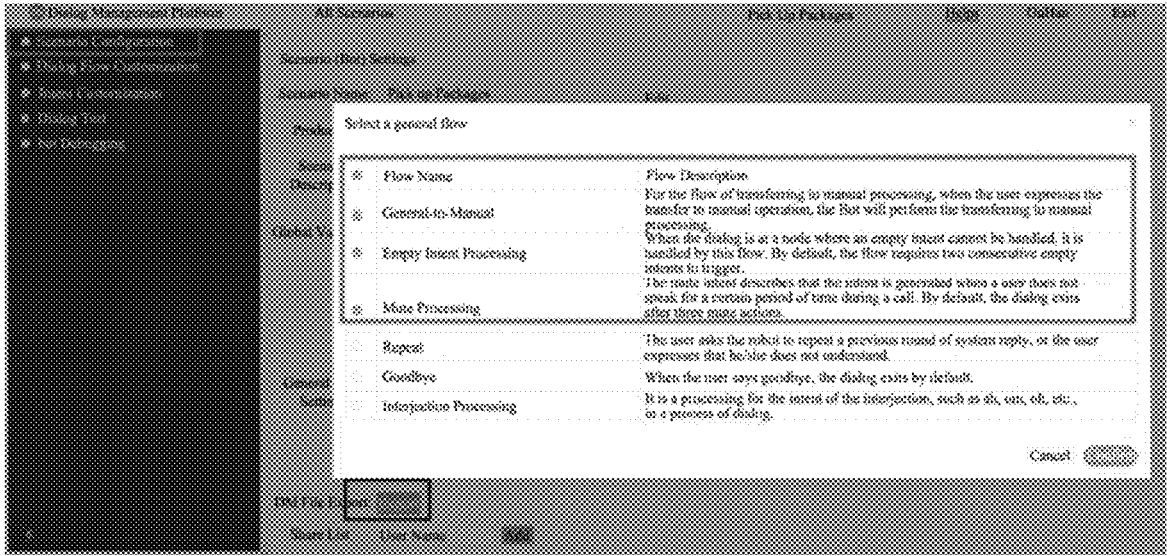
Figure 7H:
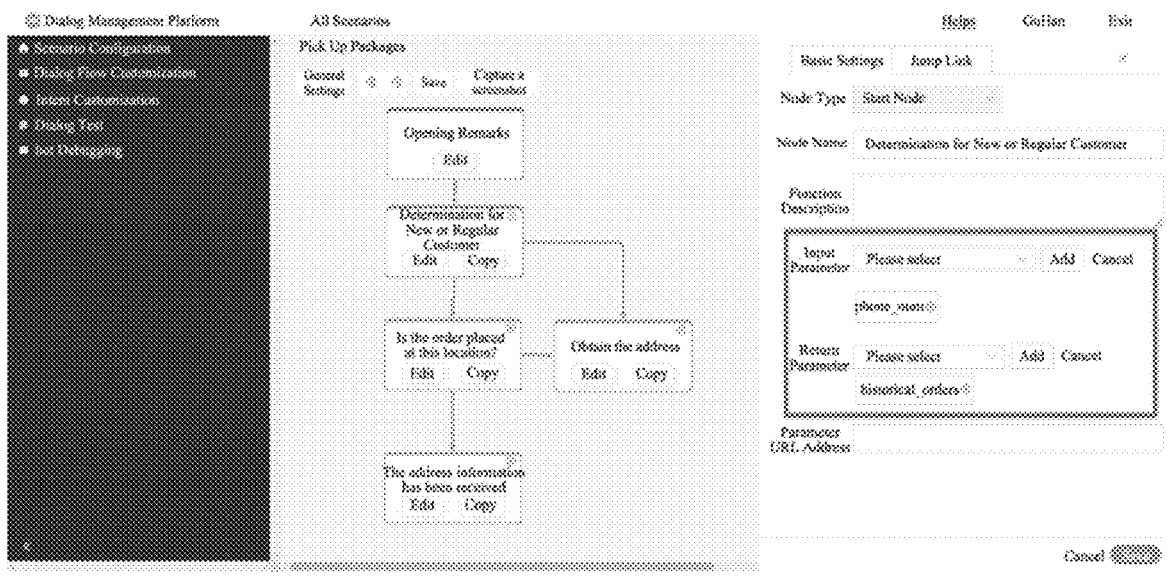
Figure 7I:
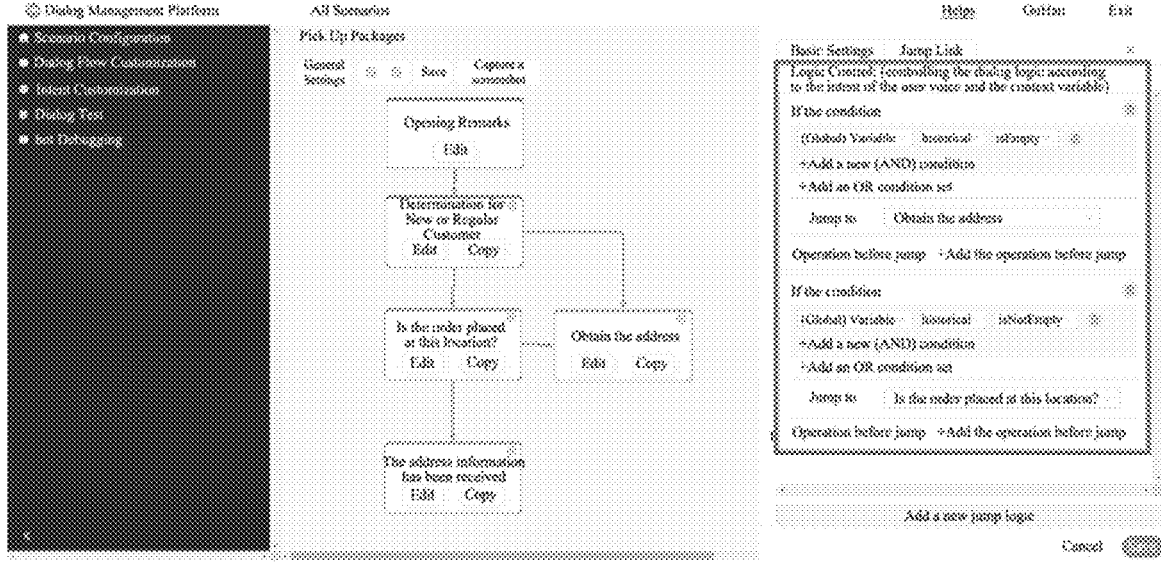
Figures 7J, 7K:
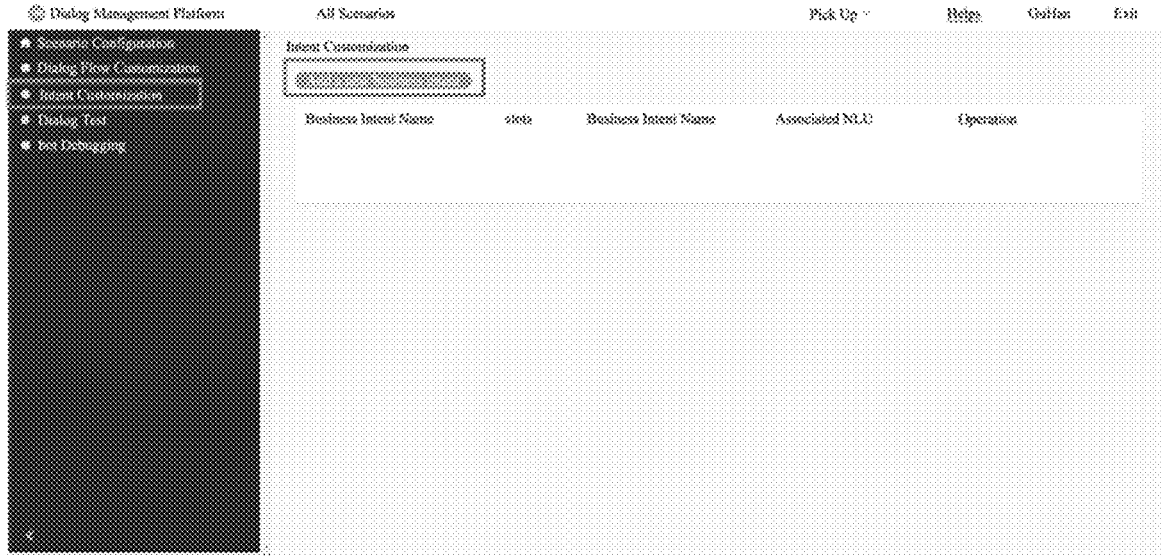
Figure 7L:
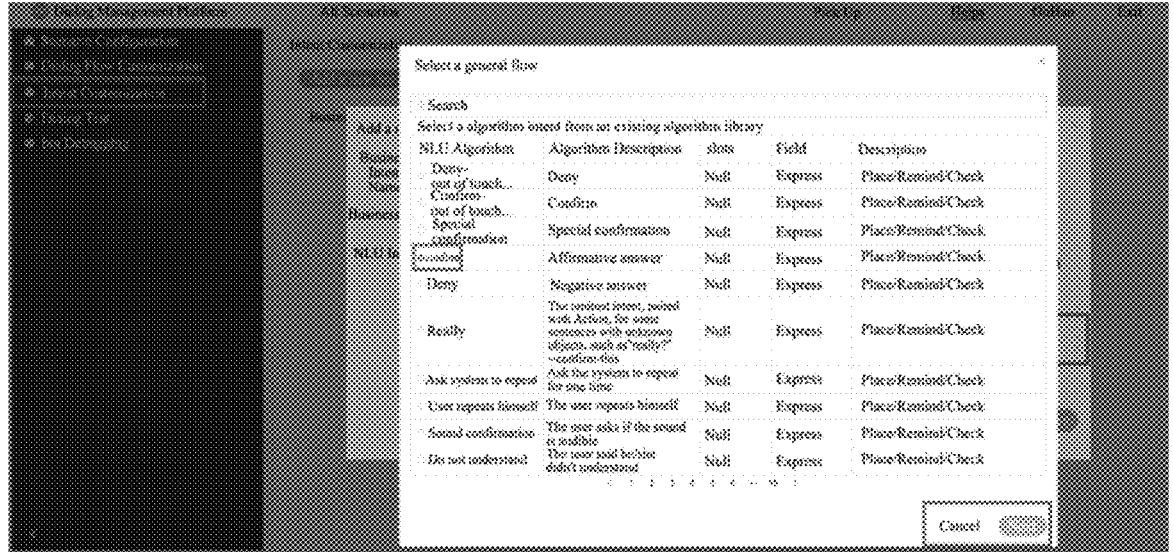
Figure 7M:
Figure 7N:
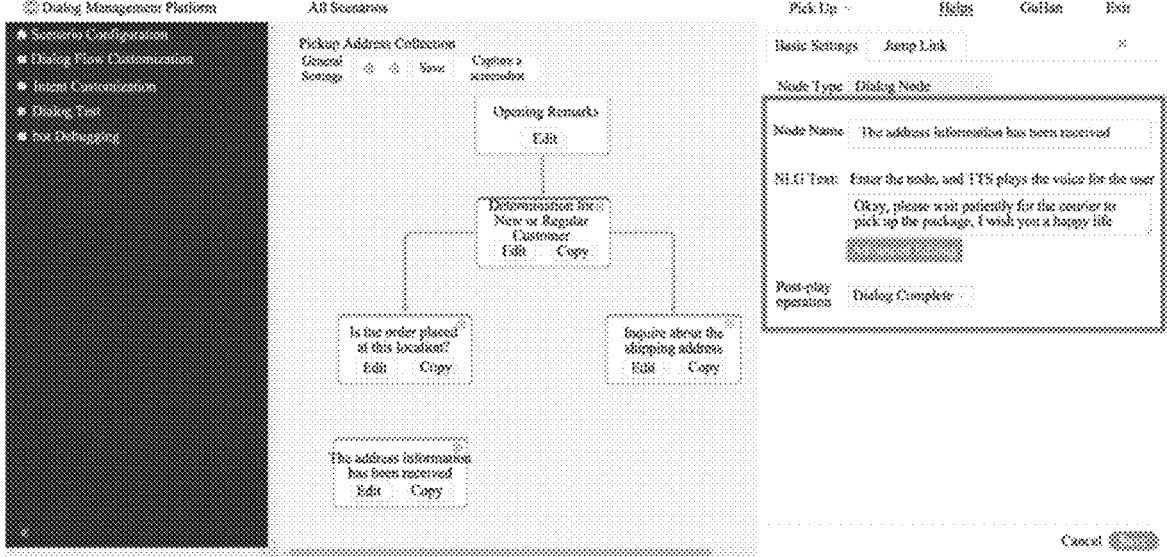
Figure 7O:
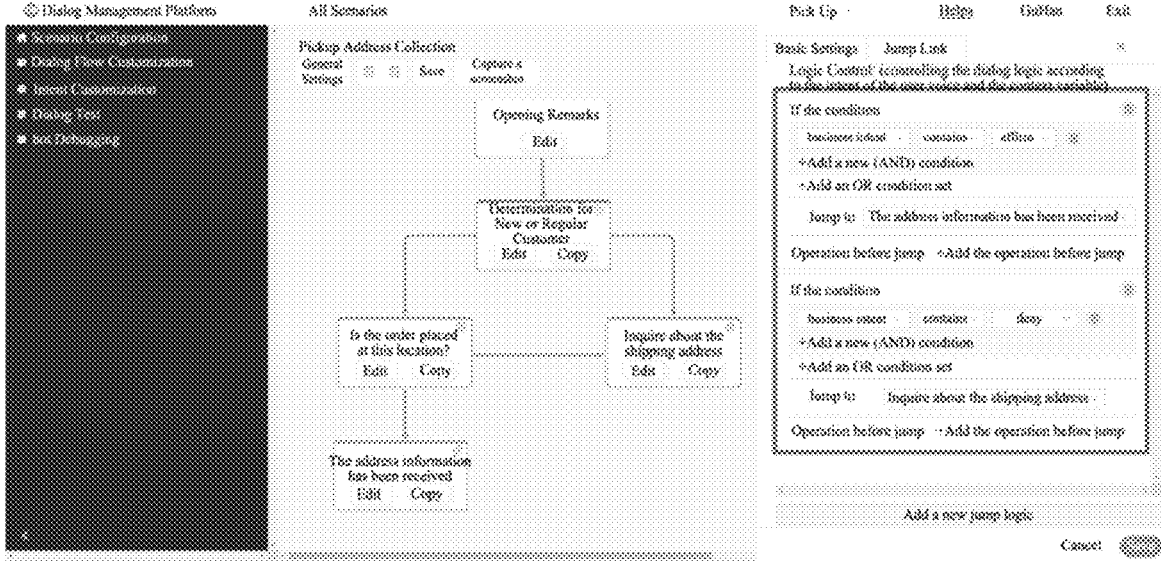
Figures 7P, 7Q:
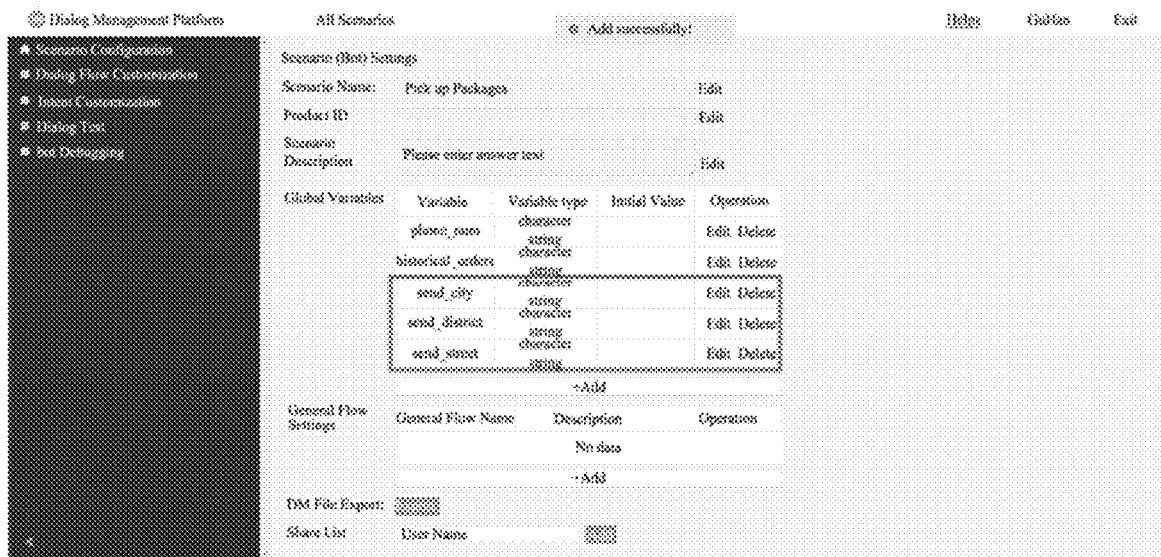
Figures 7R, 7S:
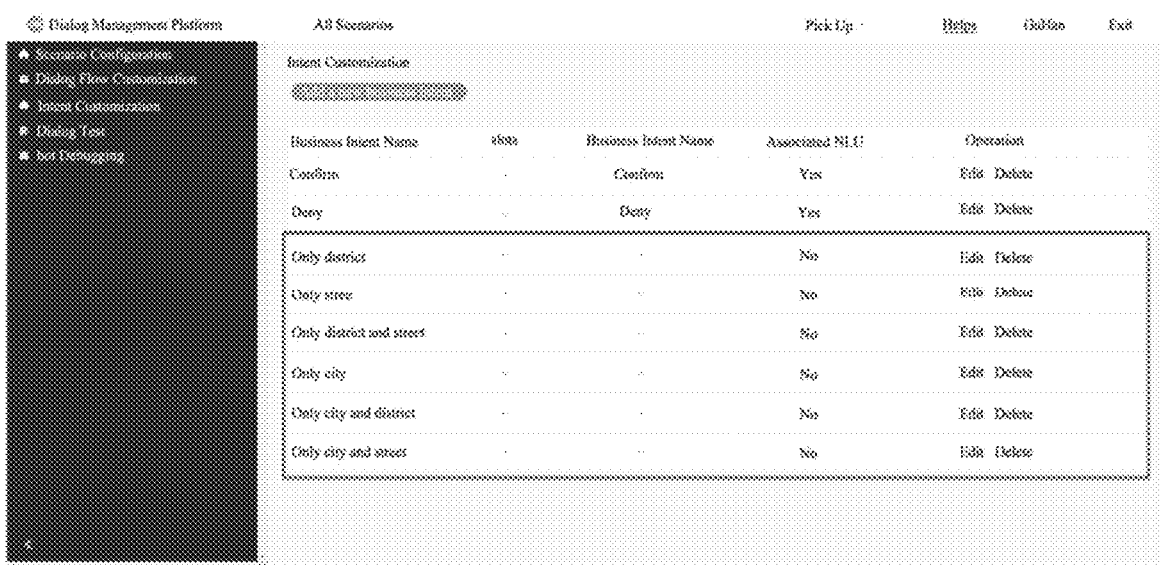
Figure 7T:
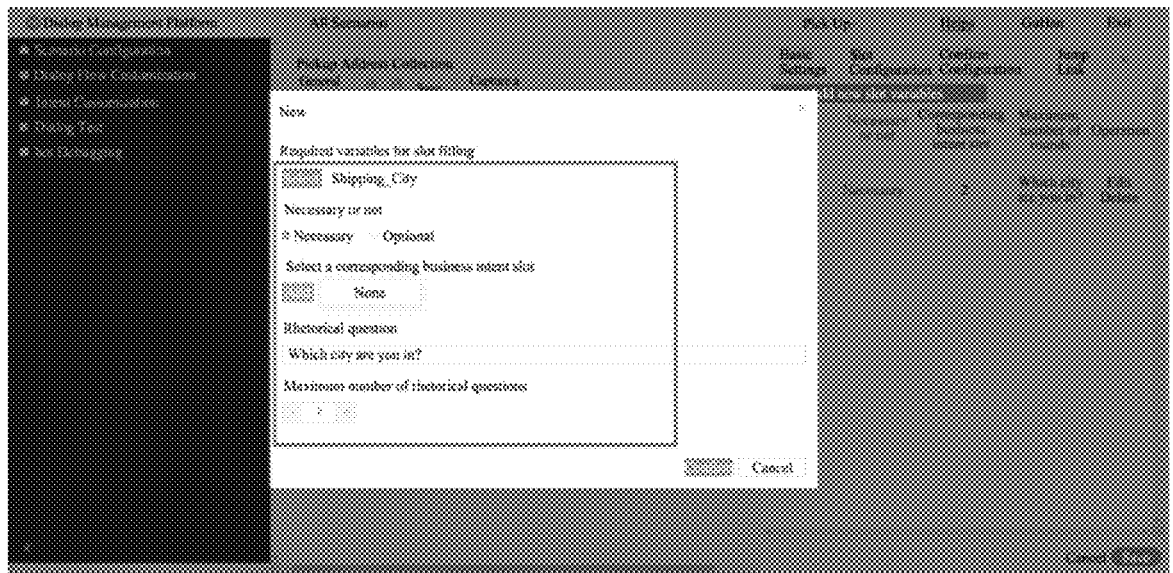
Figure 7U:
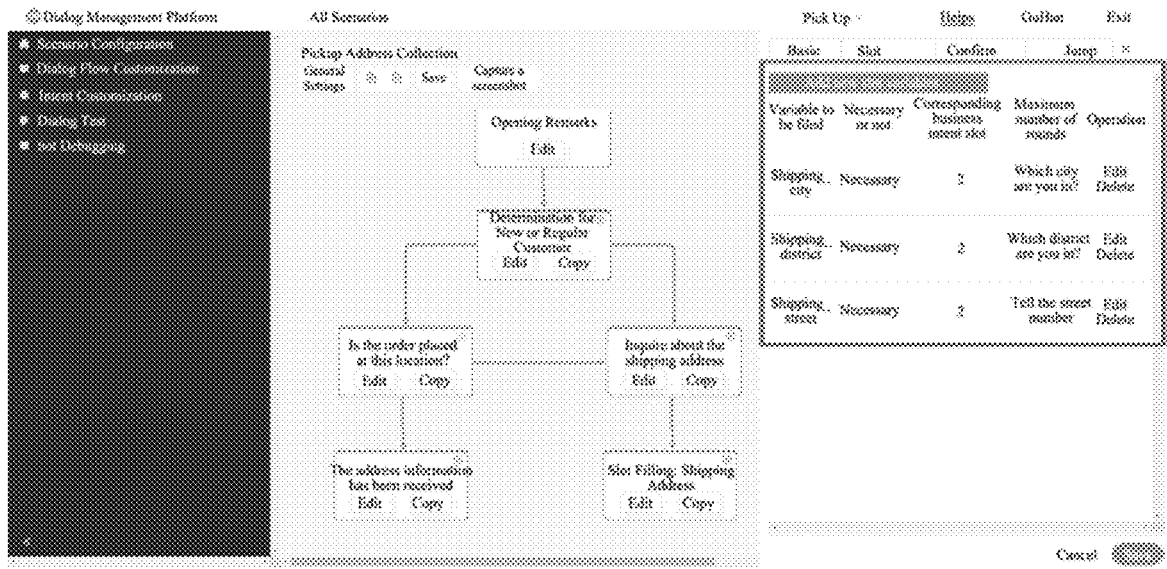
Figure 7V:
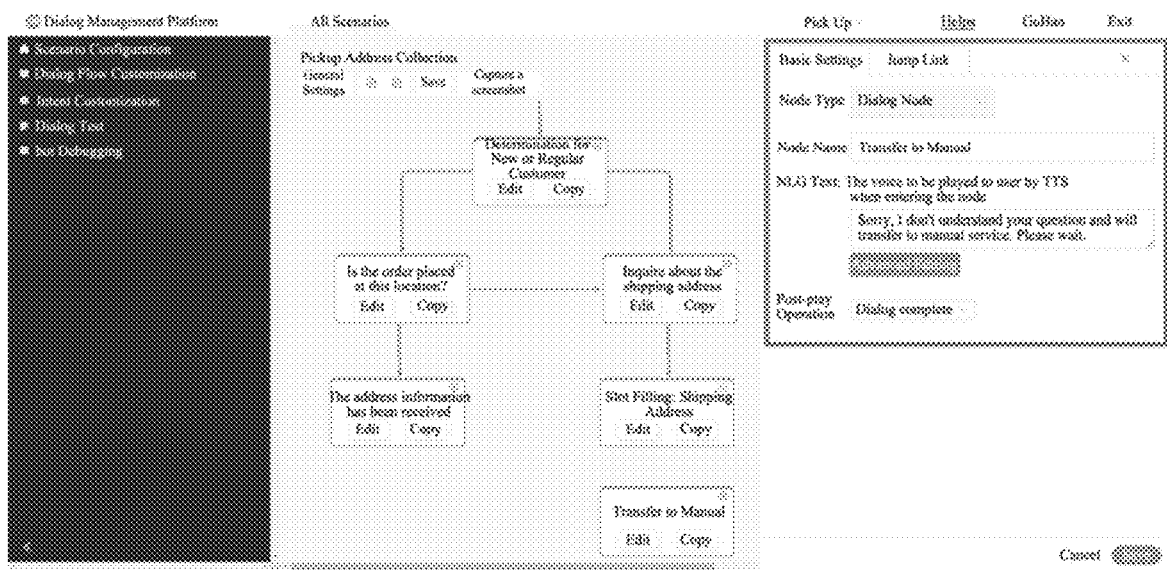
Figure 7W:
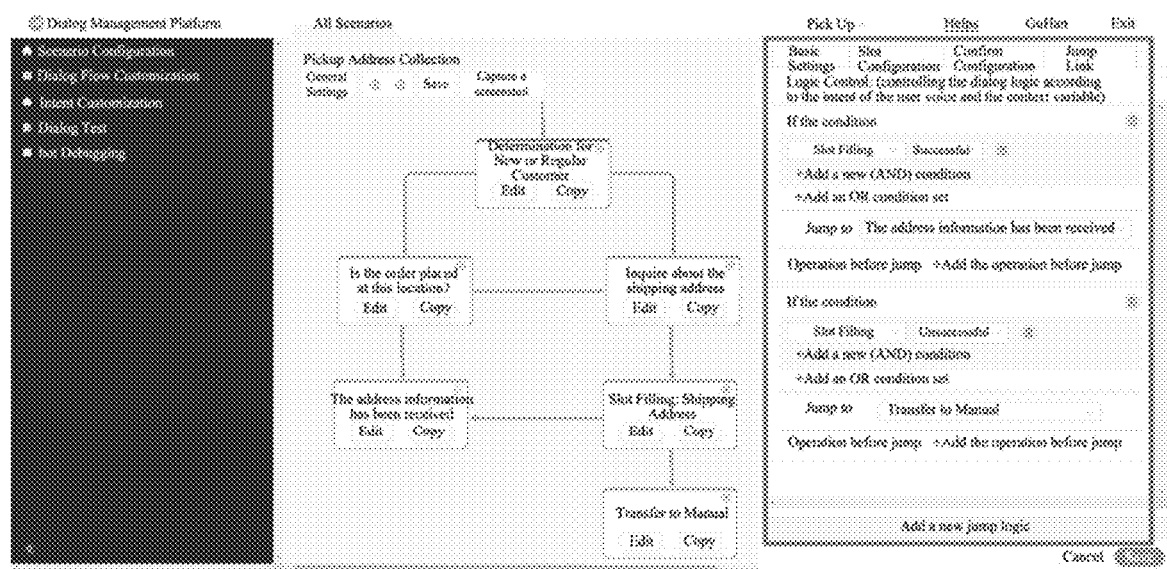
Figure 7X:
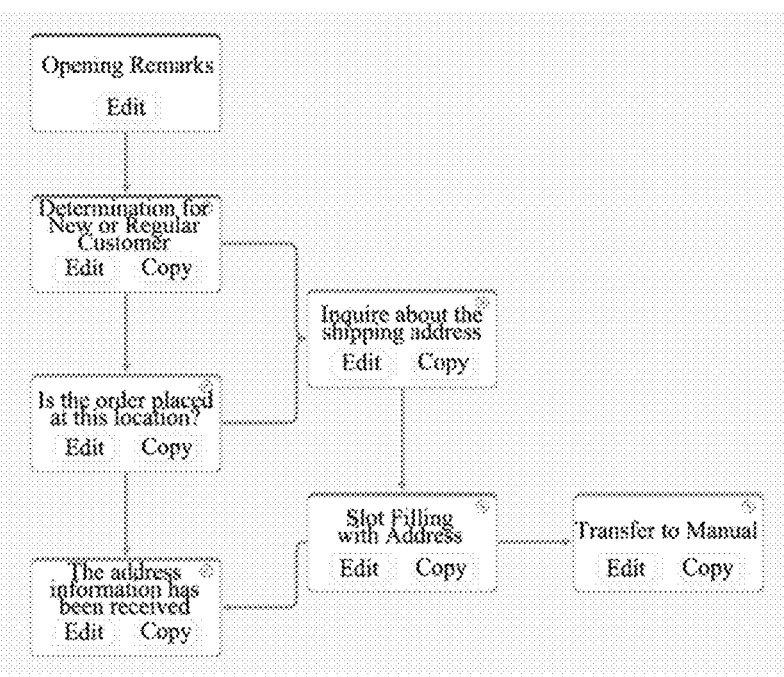
Figure 7Y:
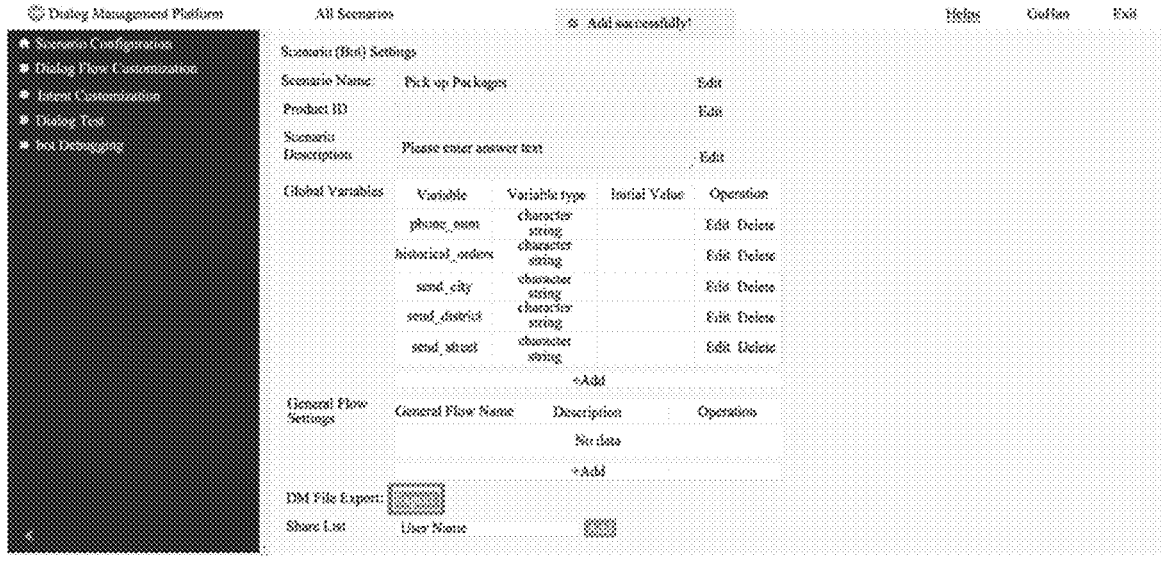
Figure 7Z:
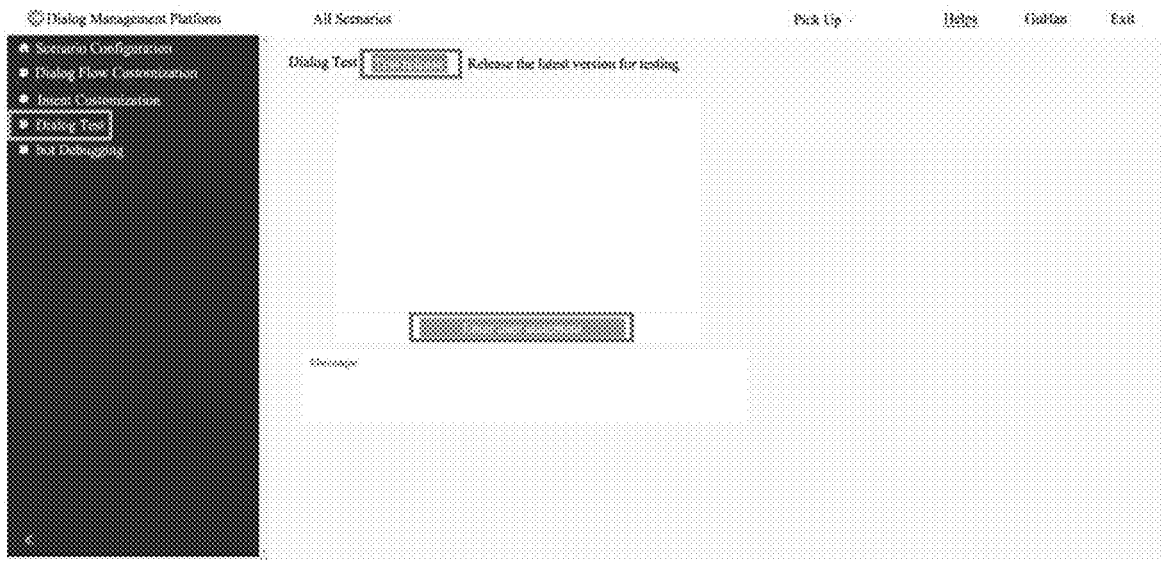

The following will describe an example of DM building in the dialogue flow design client 10 under the specific express customer service scenario shown in FIG. 3 in conjunction with the screenshots of the development client in FIGS. 7A-7Z.

As shown in FIG. 7A, a dialogue box will pop up after clicking a Create New Scenario part on the left, and "Scenario Name" and "Scenario Description" can be entered. Here, a scenario can represent a customer service project.

Next, as shown in FIG. 7B, a new dialogue flow is created. A following page can be entered by clicking a created scenario "Express". On the left are: 1) Scenario Configuration: including Scenario Name, Product ID, Global Variable Addition, General Flow Addition, etc.; 2) Dialogue Flow Customization: drawing the dialogue flow on this page; 3) Intent Customization: adding the intent parsed from the user utterance; 4) Dialogue Test: testing the built model; and 5) Bot Debugging: modifying and debugging the code automatically generated by the dialogue flow model built by a visualization tool.

A user interface shown in FIG. 7C is accessed by clicking the Dialogue Flow Configuration. At this time, a new dialogue flow "Pickup Address Collection" is created, and by clicking it an interface shown below can be accessed. There are four kinds of nodes on the right, namely: a start node (or an initial node), a dialogue node (or a user communication node), a function node (or a user information identification node) and a slot filling node.

During the node configuration process, an "Opening Remarks" corresponding to the start node (as shown in FIG. 7D) is added first. Referring to the screenshot of the interface shown in FIG. 7E, the specific operations include: 1) clicking the "Start Node" on the right to add a start node on the panel; 2) clicking "Edit" on the start node; 3) modifying the node name to "Opening Remarks" and adding the text "Hello, this is xx express" through "Basic Settings"; and 4) adding a new jump logic—Jump To and selecting the next node to jump (it is necessary to add the next node before jumping, and this step can be skipped first) through "Jump Connection".

Next, a function node—"Determination for New or Regular Customer" is added. As shown in FIG. 7F, the function node is created on the panel by clicking "Function Node", which includes: 1) clicking Edit, and in the basic settings, the node name is modified to "Determination for New or Regular Customer", and the function description "determining whether this phone number has historical orders" is added and saved; 2) completing the jump from the start node to the function node: "Determination for New or Regular Customer" is selected to jump, and a connecting line between the dialogue nodes is shown; and 3) turning to "Scenario Configuration", and creating two new global variables: phone_num, historical_orders. At the same time, a general DM flow can be added on this page, as shown in FIG. 7G, general flows that may be used are selected; 4) returning to the dialogue flow, as shown in FIG. 7H, editing the basic settings of "Function Node", entering the parameter setting "phone_num", and returning the parameter setting "historical_orders".

Next, as shown in FIG. 7I-M, user communication nodes—"Is the order placed at this location?" and "Inquire about the shipping address" are added. 1) Adding two user communication nodes, renaming them to "Is the order placed at this location?" and "Inquire about the shipping address" are added. 2) Editing "Determination for New or Regular Customer" and setting jump link. "Add New Jump Logic" below is clicked, causing a jump from the condition setting "Global Variable History Order Status isNotEmpty" to "Is the order placed at this location?"; "Add New Jump Logic" is clicked again, causing a jump from the condition setting "Global Variable History Order Status isEmpty" to "Inquire about the shipping address", then saving the above setting. 3) As shown in FIG. 7J, turning to "Intent Customization", adding a new business intent, and adding business intents "Yes" and "No". 4) Turning back to the dialogue flow customization, editing the dialogue node "Is the order placed at this location?", and entering the text "It has been found in the system that you have recently delivered items at No. XX Road, XX District, XX City, do you still use this address?". 5) Adding business intents "Yes" and "No". 6) Editing "Inquire about the shipping address" and adding the phrase "Where is your shipping address?".

Next, as shown in FIGS. 7N and 70, a dialogue node—"The address information has been received" is added. 1) Adding a broadcast dialogue node "The address information has been received"; modifying the basic settings, adding the phrase "Okay, please wait patiently for the courier to pick up the package, I wish you a happy life"; modifying "post-play operation" to "dialogue completion", and saving. 2) Editing "Is the order placed at this location?" and setting the jump link: for the condition setting "Business intent contains Yes", jumping to "The address information has been received"; and for the condition setting "Business intent contains No", jumping to "Inquire about the shipping address".

Next, as shown in FIGS. 7P-7U, a slot filling node—"Slot Filling: Shipping Address" is added. 1) Adding a slot filling node, renaming "Slot Filling: Shipping Address", editing the dialogue node "Inquire about the shipping address", setting a jump link, and jumping to "Slot Filling: Shipping Address". 2) Turning to Scenario Configuration and creating new global variables "shipping_city", "shipping_district", "shipping_street". 3) Turning to Intent Customization, and creating new intents "only the street", "only the district", "only the city", "only the street and the district", "only the district and the city", and "only the street and the city". 4) Returning to the dialogue flow customization and editing "Slot Filling: Shipping Address"; clicking Basic Settings to add the above six intents. 5) Editing "Slot Filling: Shipping Address", clicking Slot Configuration to add a new slot variable and set as follows in turn: variables that need slot filling—Shipping_City, Required, Intent—"only the street", "only the district", and "only the street and district"; entering the rhetorical question "Which city are you in?"; the maximum number of rhetorical questions is set to 2. 6) Adding the other two slot variables in the same way.

Next, as shown in FIGS. 7V and 7W, a dialogue node—"Transfer to Manual" is added, which includes 1) adding a dialogue node "Transfer to Manual", for which a phrase is set and the Dialogue Completion is selected. 2) Editing "Slot Filling: Shipping Address" and clicking the jump link. For the condition "Slot Filling Successful", jump is made to "The address information has been received"; for the condition "Slot Filling Unsuccessful", jump is made to "Transfer to Manual". Thus, the above dialogue flow is completed. The final result of the dialogue flow is shown in FIG. 7X.

Then, it can be saved locally. As shown in FIG. 7Y, the j son file can be saved locally through "Scenario Configuration—DM File Export".

In some embodiments, the constructed dialogue flow may also be tested locally to ensure the perfection of the functions. As shown in FIG. 7Z, the test operation is performed by "clicking Dialogue Test-Test Release-Input User Voice".

In the embodiments of the present application, a rapid customization platform is provided, which can greatly accelerate the development speed of intelligent speech in a call center, and significantly reduce the development cost, thereby improving the intelligence level of the entire call center industry.

Figure 8:
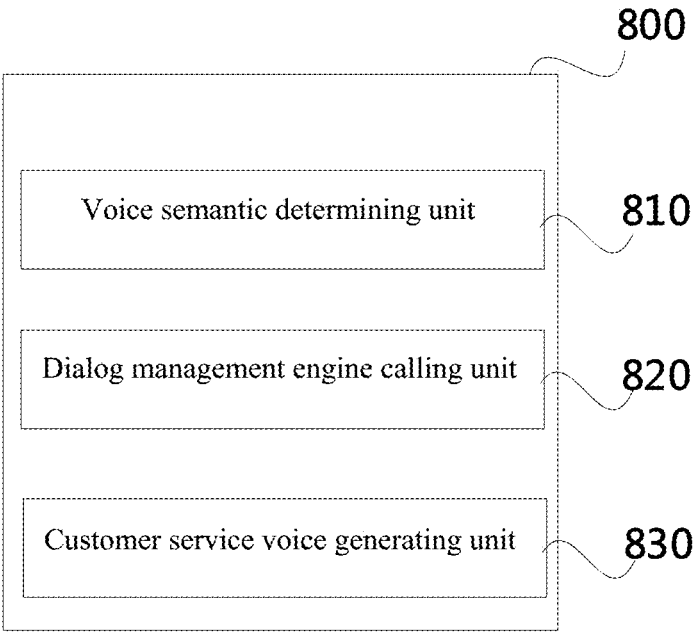
FIG. 8 shows a structural block diagram of a voice dialogue processing device according to an embodiment of the present application.

As shown in FIG. 8, a voice dialogue processing device 800 according to an embodiment of the present application includes a voice semantic determining unit 810, a dialogue management engine calling unit 820 and a customer service voice generating unit 830. The voice semantics determining unit 810 is used for determining the voice semantics corresponding to the user voice to be processed; and the dialogue management engine calling unit 820 is used for determining a reply sentence for the voice semantics based on the dialogue management engine. A training sample set of the dialogue management engine is constructed from a dialogue business customization file including at least one dialogue flow, and the dialogue flow includes a plurality of dialogue nodes in a set order; and the customer service voice generating unit 830 is used for generating a customer service voice for replying to the user voice according to the determined reply sentence.

The device in the above embodiments of the present application can be used to implement the corresponding method embodiments in the present application, and correspondingly achieve the technical effects achieved by the above method embodiments of the present application, which will not be repeated here.

In the embodiments of the present application, relevant functional modules may be implemented by a hardware processor.

On the other hand, an embodiment of the present application provides a storage medium on which a computer program is stored, and the program is executed by a processor to implement steps of the local management method executed on the server as described above.

The above product can execute the method provided by the embodiments of the present application, and has functional modules and beneficial effects corresponding to the execution of the method. For technical details not described in detail in the present embodiments, reference may be made to the methods provided in the embodiments of the present application.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices; and (4) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

The invention claimed is:

1. A computer-implemented voice dialogue processing method involving at least a voice customer service server and a dialogue flow design server, wherein the voice customer service server comprises at least an Automatic Speech Recognition (ASR) module, a Natural Language Understanding (NLU) module, a Natural Language Generation (NLG) module, a Text To Speech (TTS) module, and a dialogue management engine, the method comprising:

obtaining, by the dialogue flow design server, a dialogue flow design request from a dialogue flow design client, and determining at least one dialogue flow corresponding to the dialogue flow design request, wherein the dialogue flow comprises a plurality of dialogue nodes having a set order, the dialogue nodes further includes a phrase that the dialogue node replies to the user, a list of intents used to parse the user voice, and a jump logic; and wherein the dialogue flow design request is generated by drawing a plurality of dialogue flows for one dialogue project on the dialogue flow design client by a voice business personnel of the provider;

generating, by the dialogue flow design server, a dialogue business customization file by parsing the at least one dialogue flow to automatically identify a node content and node type of each ordered node in the at least one dialogue flow, the dialogue business customization file being a JSON file;

sending, by the dialogue flow design server, the dialogue business customization file to a voice customer service server, loading the dialogue business customization file by the dialogue management engine of the voice customer service server;

generating a training sample set for the dialogue management engine based on the dialogue business customization file and then training the dialogue management engine using the training sample set, by the voice customer service server;

performing speech recognition and semantic understanding on a user voice to be processed, by the ASR module and the NLU module of the voice customer service server, to determine corresponding voice semantics;

determining a reply sentence for the voice semantics, by the voice customer service server, based on the trained dialogue management engine of the voice customer service server; and performing natural language generation and speech synthesis on the determined reply sentence, by the NLG module and the TTS module of the voice customer service server, to generate a customer service voice for replying to the user voice.

2. The method of claim 1, wherein the dialogue flow design client is configured to have a graphical interface for a user to drag and drop a dialogue node box, wherein the dialogue flow design client is used to receive a corresponding dialogue flow design request generated with respect to a user operation of the graphical interface.

3. An electronic device, including: at least one processor, and a memory communicatively connected to the at least one processor, wherein the memory stores instructions executable by the at least one processor, which are executed by the at least one processor to enable the at least one processor to perform steps of the method claim 1.

4. A non-transitory computer-readable storage medium storing a computer program, wherein the computer program implements steps of the method of claim 1 when executed by a processor.

5. The electronic device of claim 3, wherein the dialogue management engine comprises a general dialogue management model and a business dialogue management model, wherein, determining the reply sentence for the voice semantics based on the dialogue management engine includes:

determining a user intent indicated by the voice semantics; and using the general dialogue management model to perform a general dialogue operation for the user intent when the user intent belongs to a general intent set, wherein the general dialogue operation includes any one of the following: transferring to manual operation, repeating broadcast operation, exiting dialogue operation, and interjection processing operation.

6. The electronic device of claim 5, wherein the method further comprises:

using the business dialogue management model to perform a business operation including the following to determine the reply sentence, when the user intent does not belong to the general intent set:

determining a target dialogue flow corresponding to the user intent;

determining the reply sentence according to dialogue nodes in the determined target dialogue flow.

7. The electronic device of claim 3, wherein the dialogue business customization file is obtained from a dialogue flow design server, and the dialogue flow design server is configured to interact with the dialogue flow design client to construct the dialogue business customization file.

8. The electronic device of claim 3, wherein the dialogue nodes include a dialogue start node, a user communication node, a user information identification node, and a slot filling node.

9. The electronic device of claim 5, wherein the dialogue nodes include a dialogue start node, a user communication node, a user information identification node, and a slot filling node.

10. The electronic device of claim 6, wherein the dialogue nodes include a dialogue start node, a user communication node, a user information identification node, and a slot filling node.

11. The electronic device of claim 7, wherein the dialogue nodes include a dialogue start node, a user communication node, a user information identification node, and a slot filling node.

12. The method of claim 1, wherein the dialogue management engine comprises a general dialogue management model and a business dialogue management model, wherein, determining the reply sentence for the voice semantics based on the dialogue management engine includes:

determining a user intent indicated by the voice semantics; and using the general dialogue management model to perform a general dialogue operation for the user intent when the user intent belongs to a general intent set, wherein the general dialogue operation includes any one of the following: transferring to manual operation, repeating broadcast operation, exiting dialogue operation, and interjection processing operation.

13. The method of claim 12, further comprising:

using the business dialogue management model to perform a business operation including the following to determine the reply sentence, when the user intent does not belong to the general intent set;

determining a target dialogue flow corresponding to the user intent;

determining the reply sentence according to dialogue nodes in the determined target dialogue flow.

14. The method of claim 1, wherein the dialogue business customization file is obtained from a dialogue flow design server, and the dialogue flow design server is configured to interact with the dialogue flow design client to construct the dialogue business customization file.

15. The method of claim 1, wherein the dialogue nodes include a dialogue start node, a user communication node, a user information identification node, and a slot filling node.

16. The method of claim 12, wherein the dialogue nodes include a dialogue start node, a user communication node, a user information identification node, and a slot filling node.

17. The method of claim 13, wherein the dialogue nodes include a dialogue start node, a user communication node, a user information identification node, and a slot filling node.

18. The method of claim 14, wherein the dialogue nodes include a dialogue start node, a user communication node, a user information identification node, and a slot filling node.

* * * * *